United States Patent [19]
Granger

[11] Patent Number: 6,005,968
[45] Date of Patent: Dec. 21, 1999

[54] SCANNER CALIBRATION AND CORRECTION TECHNIQUES USING SCALED LIGHTNESS VALUES

[75] Inventor: Edward M. Granger, Rochester, N.Y.

[73] Assignee: X-Rite, Incorporated, Grandville, Mich.

[21] Appl. No.: 08/921,395

[22] Filed: Aug. 29, 1997

[51] Int. Cl.[6] ................................................ G06K 9/00
[52] U.S. Cl. .......................... 382/162; 358/522; 358/523
[58] Field of Search .................................. 358/500, 504, 358/509, 517, 520, 527, 522, 523; 382/162

[56] References Cited

U.S. PATENT DOCUMENTS

| | | | |
|---|---|---|---|
| 3,986,202 | 10/1976 | Granger | 358/4 |
| 4,843,573 | 6/1989 | Taylor et al. | 395/131 |
| 4,929,978 | 5/1990 | Kanamori et al. | 355/38 |
| 5,231,504 | 7/1993 | Magee | 358/500 |
| 5,243,414 | 9/1993 | Dalrymple et al. | 358/500 |
| 5,309,257 | 5/1994 | Bonino et al. | 358/504 |
| 5,313,291 | 5/1994 | Appel et al. | 358/501 |
| 5,317,425 | 5/1994 | Spence et al. | 358/504 |
| 5,323,249 | 6/1994 | Liang | 358/518 |
| 5,450,216 | 9/1995 | Kasson | 358/518 |
| 5,463,480 | 10/1995 | MacDonald et al. | 358/520 |
| 5,650,942 | 7/1997 | Granger | 364/526 |

FOREIGN PATENT DOCUMENTS

| | | | |
|---|---|---|---|
| 0 750 419 | 12/1996 | European Pat. Off. | H04N 1/60 |
| 195 14 618 | 11/1995 | Germany | H04N 1/60 |
| 08 111784 | 4/1996 | Japan | H04N 1/60 |

OTHER PUBLICATIONS

Granger, E.M. et al., "Visual Chromaticity Transfer Functions," 1973 Annual Meeting, Optical Society of America, (Abstract) pp. 1287–88 (Color II, Contributed Papers (C.J. Bartleson, Presider)).

Granger, E.M., "Subjective Assessment and Specification of Color Image Quality," *Image Assessment Spec. Opt. Soc. Am.* 1974, pp. 86–92.

Granger, Edward M., "A Summary Measure of Image Quality," SPIE vol. 432 (1983), pp. 340–347.

Granger, Edward M., "Visual Limits to Image Quality," SPIE vol. 528, *Digital Image Processing* (1985), pp. 95–102.

Granger, E.M., "Uniform Color Space as a Function of Spatial Frequency," SPIE vol. 1913 (1993), pp. 449–461.

Granger, E.M., "Is CIE L*a*b* Good Enough for Desktop Publishing?" SPIE vol. 2170, *Device–Independent Color Imaging*, pp. 144–148 (Eric Walowit, Chair/Editor; Feb. 7–8, 1994, San Jose, CA).

Granger, E.M., "ATD, Appearance Equivalence, and Desktop Publishing," SPIE vol. 2170, *Device–Independent Color Imaging*, pp. 163–168 (Eric Walowit, Chair/Editor; Feb. 7–8, 1994, San Jose, CA).

(List continued on next page.)

*Primary Examiner*—Jerome Grant, II
*Attorney, Agent, or Firm*—Townsend and Townsend and Crew LLP

[57] ABSTRACT

A technique for calibrating a scanner wherein once the scanner is calibrated, the scanner's device-dependent tristimulus values (e.g., RGB) for an arbitrary color are transformed to a device-independent representation (e.g., XYZ) of the arbitrary color in a computationally efficient manner. The scanner is characterized in a manner that a corrected device-independent representation of an arbitrary scanned color can be determined on the basis of a pair of chromaticity coordinates in a chromaticity space having (i) a pair of chromaticity coordinates that span hue and chroma (saturation), and (ii) a lightness coordinate that is a luminance correlate (monotonic function of luminance). A lookup table stores XYZ values and a lightness value. A set of XYZ values and a lightness value are retrieved from the table as addressed by a pair of chromaticity values corresponding to the scanned value. The XYZ values from the table are then scaled by the ratio of the scanned lightness value to the lightness value from the table to provide the XYZ values for the arbitrary color.

38 Claims, 3 Drawing Sheets

OTHER PUBLICATIONS

Granger, E.M., "A Constant–Bandwidth Grating–Lens Spectrometer," SPIE vol. 2413, *Color Hard Copy and Graphic Arts IV,* pp. 333–338 (Jan Bares, Chair/Editor; Feb. 6–10, 1995, San Jose, CA).

Granger, E.M., "Gamut Mapping for Hard Copy Using the ATD Color Space," SPIE vol. 2414, *Device–Independent Color Imaging II,* pp. 27–35 (Eric Walowit, Chair/Editor; Feb. 7–8, 1995, San Jose, CA).

Benzschawel et al., "ATD: Toward a Uniform Color Space," *Color Research & Appl.,* vol. 9, No. 3, pp. 133–140.

SCANNER CALIBRATION AND CORRECTION TECHNIQUES USING SCALED LIGHTNESS VALUES

BACKGROUND OF THE INVENTION

The present invention relates generally to color management in graphic arts (GA) publishing, and more specifically to techniques for calibrating scanners. The term "scanner" used herein is intended to include not only devices that scan a printed input but also other devices that receive radiation and output color signals, such as digital cameras.

A computer system providing color management functions comprises various devices that receive or output color images. Each such device usually has its own, device-dependent, way of specifying a particular color. Typically, each device communicates color information to other devices by mapping its device-dependent color specifications into corresponding specifications in a common device-independent representation of color used throughout the computer system. One such device-independent representation of color is the XYZ color space defined by the CIE (Commission Internationale de l'Éclarage in French).

One common device in color management systems is a scanner, which scans a color printed image. A typical scanner provides a set of RGB (red-green-blue) values, each normally ranging from 0–255, with (0, 0, 0) ideally corresponding to black and (255, 255, 255) to white (no colorant). Typically, a scanner must be calibrated in order to provide accurate mapping from the scanner's color representations to corresponding device-independent color representations, over the range of colors that are expected to be encountered. Accurate device-independent representations can then be shared with other devices (such as a monitor), enabling them to accurately reproduce colors that look like the colors in the scanned printed image or captured scene. The use of the term "color printed image" is intended to include not only images printed on paper but also other types of scanner inputs, such as films, transparencies, and slides. The term "printer" is intended to include the devices producing such scanner inputs and against whose output the scanner is to be calibrated.

One approach to scanner calibration involves building a lookup table, whose entries are indexed by scanner color representation, with each entry containing a respective corresponding device-independent color representation. The scanner color representation associated with each table entry is obtained by scanning a sample of a respective color from the input color space. The corresponding device-independent color representation is obtained by examining the color sample with a device that can provide device-independent color representations, such as a spectrophotometer. An interpolation technique is used to calculate a device-independent color representation corresponding to an arbitrary scanner color representation, using the values stored in two or more of the look-up table entries.

The required interpolation technique is typically three-dimensional, and thus computationally expensive. Given that a scanned image may have millions of pixels, the interpolation technique may result in an unacceptably slow mapping from a scanner representation to a device-independent representation of the colors in the image. Further, to build a look-up table over the three-dimensional scanner color space may require a very large number of samples to adequately capture the range of possible colors.

In view of these difficulties, attempts have been made to find a linear mapping between the scanner's device-dependent color representations (e.g., scanner RGB values) and the desired device-independent color representations (e.g., XYZ values). Put another way, attempts have been made to determine a 3×3 transformation matrix, M, such that the XYZ values, denoted $X_a$, $Y_a$, and $Z_a$, for an arbitrary set of scanner RGB values denoted $R_a$, $G_a$, and $B_a$, are determined as follows:

$$(X_a, Y_a, Z_a) = (R_a, G_a, B_a) * M.$$

This has typically been done by measuring a number of color samples distributed over the input color space, and doing a least squares fit (or other type of fit) to determine the matrix parameters. Since the mapping is, in general, not linear over the entire color space, such efforts have not led to acceptable results.

SUMMARY OF THE INVENTION

The present invention provides techniques for calibrating a scanner and correcting measurements from a scanner so that once the scanner is calibrated, the scanner's device-dependent tristimulus values for an arbitrary color are transformed to an extremely faithful device-independent representation of the arbitrary color in a computationally efficient manner.

In brief, the invention characterizes a scanner in a manner that a corrected device-independent representation of a scanned color can be determined on the basis of a pair of chromaticity coordinates in a chromaticity space having (i) a pair of chromaticity coordinates that span hue and chroma (saturation), and (ii) a lightness coordinate that is a luminance correlate (monotonic function of luminance).

A calibration technique according to a specific embodiment of the invention proceeds as follows. First, a set of color samples is measured, both with the scanner and with a measurement device (such as a spectrophotometer) that provides device-independent color representations. In a specific embodiment, the scanner representations are RGB tristimulus values and the device-independent representation of a color is the set of XYZ values for that color. For each color sample, the scanner values are transformed to representations in a chromaticity space. These measurements are used to generate a look-up table, indexed by the two chromaticity coordinates, with each entry in the table including device-independent values and a device-dependent lightness value, either directly taken from the measurement of a single color sample or derived from measurements of a plurality of color samples.

In general, the scanner measurements of color samples are not uniformly spaced in chromaticity space. Therefore, it is preferred to interpolate the sets of measured values (i.e., the device-independent values and the device-dependent lightness value for the different samples) in order to generate a table having entries labeled by equally spaced values of the pair of chromaticity coordinates. If desired, the interpolation can be modified to build gamut compression into the table.

A technique for correcting a scanner measurement of an arbitrary color proceeds as follows. A set of device-independent values (such as XYZ) and a lightness value are determined as a function of a pair of chromaticity values corresponding to the scanned value. The determined device-independent values are then scaled by the ratio of the scanned lightness value to the determined lightness value to provide the device-independent values for the scanned color.

In a specific embodiment, the function that provides the set of device-independent values and the lightness value as a function of the chromaticity coordinates is implemented by a table, such as that mentioned above, indexed by the two chromaticity coordinates. The table entries are typically determined by interpolating the values from the measured color samples.

In an embodiment using such a table, a technique for correcting a scanner measurement according to the invention proceeds as follows. To the extent that the scanner measurement is not in the chromaticity representation, it is converted to the chromaticity representation.

The scanner's uncorrected chromaticity values are then used to access the relevant portion of the table and retrieve the device-independent values and the device-dependent lightness value corresponding to the pair of uncorrected chromaticity values. If the table has entries for all possible chromaticity coordinate pairs, the values are directly retrieved by look-up alone, and the table is still of a manageable size.

Even if a smaller table is used, the retrieval can be accomplished by a two-dimensional interpolation of table entries, which is computationally efficient. In this context, the term "possible" should be taken as being determined by the precision to which the chromaticity coordinates are calculated. For example, if the chromaticity coordinates are calculated to $NB_1$ and $NB_2$ bits of precision, there are only $2^{NB1+NB2}$ possible pairs of values, even though there are infinitely many possible colors.

The corrected device-independent values for the scanner measurement are then obtained by multiplying each of the retrieved device-independent values by the ratio of the scanner measurement's uncorrected lightness value to the retrieved lightness value. For example, if the device-independent values retrieved from the calibration table are designated $X_{cal}$, $Y_{cal}$, and $Z_{cal}$, the retrieved lightness value is designated $V_{cal}$, and the scanner measurement (pixel) has a lightness value designated $V_{pix}$, the corrected device-independent values for a pixel of arbitrary color, designated $X_{pix}$, $Y_{pix}$, and $Z_{pix}$, are given by:

$$X_{pix} = X_{cal} * (V_{pix}/V_{cal});$$

$$Y_{pix} = Y_{cal} * (V_{pix}/V_{cal}); \text{ and}$$

$$Z_{pix} = Z_{cal} * (V_{pix}/V_{cal})$$

In a specific embodiment, it is convenient to define the chromaticity space in terms of the scanner RGB space as follows:

$$V = (2R+3G+2B)/2 \text{ (light-dark opponent system)};$$

$$T = R-G \text{ (red-green opponent system)};$$

$$D = (R+G-2B)/2 \text{ (yellow-blue opponent system)};$$

$$t = T/V; \text{ and}$$

$$d = D/V.$$

The values of variables t and d are normalized chromaticity coordinates characterized by a given proportion of R, G, and B, and represent the direction cosines of a vector in V-T-D space. It is sometimes convenient to convert t and d to a pair of values r representing chroma (saturation) and $\theta$ representing hue where:

$$r = (t^2 + v^2)^{1/2}; \text{ and}$$

$$\theta = \tan^{-1}(t/d).$$

In this representation, a given hue is sometimes said to be characterized by a given hue angle, $\theta$. In a specific embodiment, the table is labeled by r and $\theta$, but the interpolations to build the table are done in t-d space.

A further understanding of the nature and advantages of the present invention may be realized by reference to the remaining portions of the specification and the drawings.

DESCRIPTION OF SPECIFIC EMBODIMENTS

1. System Overview

Figure 1:
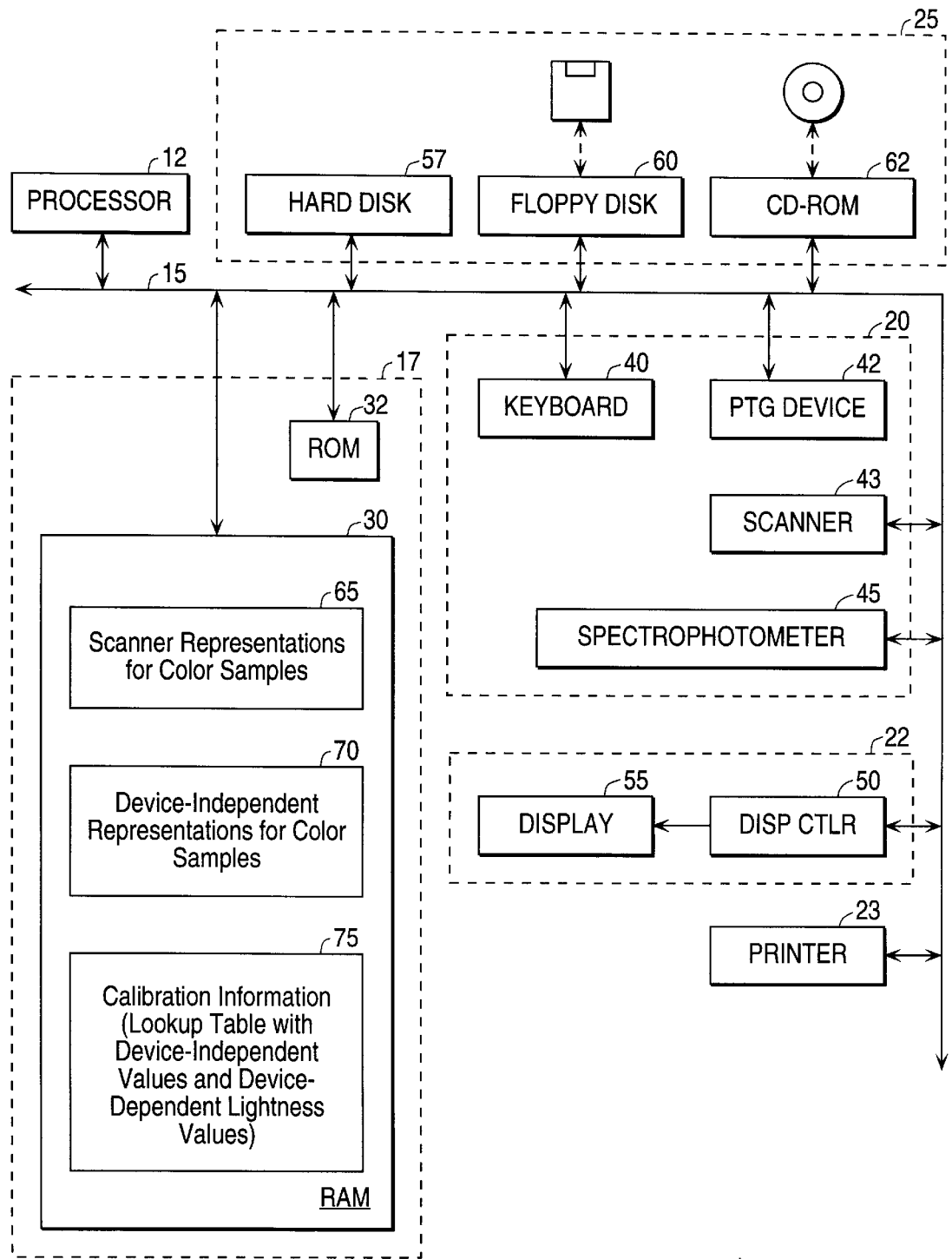
FIG. 1 is a block diagram of a computer system in which the present invention may be embodied.

FIG. 1 is a simplified block diagram of a computer system 10 in which the present invention may be embodied. In accordance with known practice, the computer system includes a processor 12 that communicates with a number of peripheral devices via a bus subsystem 15. These peripheral devices typically include a memory subsystem 17, a user input facility 20, a display subsystem 22, output devices such as a printer 23 (as broadly defined in the background section), and a file storage system 25.

In this context, the term "bus subsystem" is used generically so as to include any mechanism for letting the various components of the system communicate with each other as intended. With the exception of the input devices and the display, the other components need not be at the same physical location. Thus, for example, portions of the file storage system could be connected via various local-area or wide-area network media, including telephone lines. Similarly, the input devices and display need not be at the same location as the processor, although it is anticipated that the present invention will most often be implemented in the context of PCs and workstations.

Bus subsystem 15 is shown schematically as a single bus, but a typical system has a number of buses such as a local bus and one or more expansion buses (e.g., ADB, SCSI, ISA, EISA, MCA, NuBus, or PCI), as well as serial and parallel ports. Network connections are usually established through a device such as a network adapter on one of these expansion buses or a modem on a serial port. The computer system may be a desktop system or a portable system.

Memory subsystem 17 includes a number of memories including a random access memory (RAM) 30 (possibly including one or more caches) and a read only memory (ROM) 32 in which fixed instructions are stored. In the case of Macintosh-compatible personal computers this would include portions of the operating system; in the case of IBM-compatible personal computers, this would include the BIOS (basic input/output system).

User input facility 20 includes a keyboard 40, a pointing device 42, a scanner 43 (as broadly defined in the background section), and a spectrophotometer 45. In other embodiments the role of spectrophotometer 45 could be performed by a calorimeter. Further, a densitometer may be a useful adjunct. The pointing device may be an indirect pointing device such as a mouse, trackball, touchpad, or graphics tablet, or a direct pointing device such as a touch-screen incorporated into the display. Scanner 43 produces a bitmap image corresponding to a photographic print or slide, or other hard copy document. In the case where the scanner is a digital camera, the bitmap image has been directly captured from the scene. Spectrophotometer 45 is a color measurement device that provides device-independent spectrometric information about a single color. In a specific embodiment, the spectrophotometer may be a Colortron™ 32-band digital color sensor device, available from Light Source Computer Images, Inc. (located in San Rafael, Calif.), a subsidiary of X-Rite, Incorporated (located in Grandville, Mich.).

Display subsystem 22 typically includes a display controller 50 and a display device 55 coupled to the controller. The display device may be a cathode ray tube (CRT), a flat-panel device such as a liquid crystal display (LCD), or a projection device. Display controller provides control signals to the display device and normally includes a display memory (not shown in the figure) for storing the pixels that appear on the display device.

The file storage system provides persistent (non-volatile) storage for program and data files, and typically includes at least one hard disk drive 57 and at least one floppy disk drive 60. There may also be other devices such as a CD-ROM drive 62 and optical drives. Additionally, the system may include hard drives of the type with removable media cartridges. As noted above, one or more of the drives may be located at a remote location, such as in a server on a local area network or at a site on the Internet's World Wide Web.

In accordance with the present invention, a set of color samples, possibly produced by printer 23, are scanned by scanner 43 to produce a corresponding set of scanner color representations, which are stored in a table 65. In the specific embodiment discussed below, the color representations produced by scanner 43 consist of RGB values. However, the present invention is equally applicable to embodiments in which scanner 43 produces color representations other than RGB representations. For example, the invention is equally applicable to embodiments where scanner 43 produces a measurement other than a tristimulus measurement. For example, in one such embodiment scanner 43 might output quadstimulus (i.e., four-valued) measurements. Further, the invention is equally applicable to calibrating a scanner whose input is other than paper (e.g., slides, film). As mentioned above, the scanner could be a digital camera.

Spectrophotometer 45 individually examines each of the color samples and produces corresponding device-independent color representations, which are stored in a table 70. In the specific embodiment discussed below, spectrophotometer 45 produces XYZ color representations, as defined by the CIE (Commission Internationale de l' Éclarage in French). However, the present invention is equally applicable to embodiments in which spectrophotometer 45 produces device-independent tristimulus color representations other than XYZ representations (such as the CIE-defined xyY, Lab, or Luv color spaces).

A program executing on processor 12 uses the values stored in tables 65 and 70 to generate calibration information 75, which information is used to transform a representation produced by scanner 43 for an arbitrary color into an equivalent device-independent color representation for the arbitrary color. Calibration information 75, once constructed, is typically stored on one of the devices in file storage subsystem 22. The calibration information, when it is to be used to transform scanner representations of arbitrary colors to corresponding device-independent representations, is read into RAM 30. Tables 65 and 70 and calibration information 75 and their methods of construction and use will be described in detail in later sections.

2. Preferred Chromaticity Space

As will be described below, the present invention entails, both in calibrating a scanner and in correcting scanned colors, transforming scanned input colors to a chromaticity space. In correcting scanner measurements, the invention allows corrected device-independent values (e.g., XYZ) to be determined in a computationally efficient way. The chromaticity space should have the property that it includes a pair of chromaticity coordinates that span hue and chroma, and a luminance correlate that is substantially independent of the chromaticity coordinates. CIE xyY and CIE Yuv and derivatives thereof are suitable chromaticity spaces. CIE Lab and Luv (1976) would generally not be suitable since L is heavily correlated with a and b and with u and v.

In a preferred embodiment, it is convenient to define a chromaticity space in terms of the scanner RGB space as follows:

$V=(2R+3G+2B)/2$ (light-dark opponent system);

$T=R-G$ (red-green opponent system);

$D=(R+G-2B)/2$ (yellow-blue opponent system);

$t=T/V$;

$d=D/V.$

The values of variables t and d are normalized chromaticity coordinates characterized by a given proportion of R, G, and B, and represent the direction cosines of a vector in V-T-D space. It is sometimes convenient to convert t and d to a pair of values r and θ representing chroma (saturation) and hue, respectively, where:

$r=(t^2+v^2)^{1/2}$; and $\theta=\tan^{-1}(t/d).$

In this representation, a given hue is sometimes said to be characterized by a given hue angle.

The VTD space approximates Guth's ATD opponent vision model, but uses a different luminance correlate, namely V. It has been found that using V to normalize the chromaticity coordinates provides a chromaticity space that is more uniform in differences in perceived chroma than would be achieved by using A. Using A, on the other hand, provides a space that is more uniform in differences in perceived brightness. The value of a color's V coordinate is sometimes referred to as the V value or the lightness of the color.

The computations of A, T, and V can be accomplished by logical shifts and additions. In a specific embodiment, computations are performed with 32-bit integers, and shifts are performed last to preserve precision. It is noted that V has a value in the range 0–892.5 (R, G, and B all 0 or all 255). Each of T and D has a value in the range of −255 to 255.

If a color has only an R component, t=1 and d=½. Similarly, if a color has only a G component, t=−⅔ and d=⅓, while if a color has only a B component, t=0 and d=−1.

It has been found that an alternative chromaticity space also works. In this space, the pair of chromaticity values, denoted r and g, are related to the RGB values according to the equations:

$$r = R/(R+G+B) \text{ and}$$

$$g = G/(R+G+B);$$

and the lightness value, designated V', is given by the equation:

$$V' = (R+G+B).$$

Note that the chromaticity coordinate r in this chromaticity representation should not be confused with the chroma component r in the V-t-d representation described above.

3. Scanner Calibration

3.1 Calibration Overview

Figure 2:
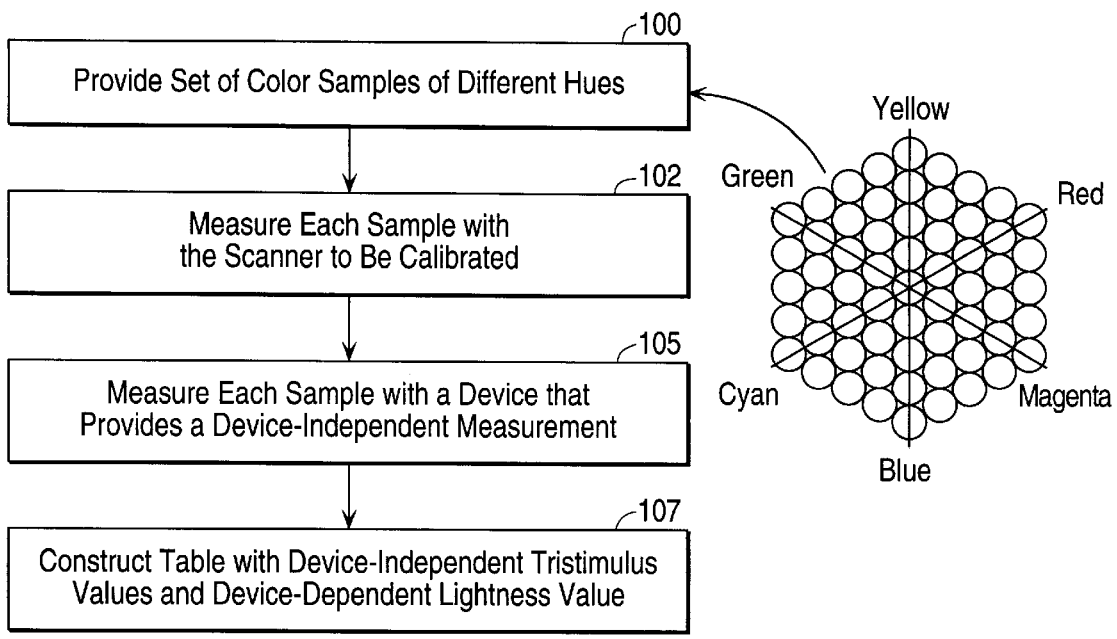
FIG. 2 is a flowchart showing a method of calibrating a scanner in accordance with the present invention.

FIG. 2 is a flowchart showing a method of calibrating a scanner in accordance with the present invention. In a step 100, a set of color samples is provided. This set preferably contains the range of colors that it is hoped to scan. To the extent that the scanner is to be calibrated for output from a particular target printer, it may be preferable to print the color samples using the target printer. If the scanner is a digital camera, the color samples preferably include the types of real-world colors that would be encountered (e.g., flesh tones, blue sky tones). The color samples preferably include a region of bare substrate (i.e., white) and a region of the darkest color (black) that is readily available.

U.S. Pat. No. 5,650,942, issued Jul. 22, 1997, to Edward M. Granger for "APPEARANCE-BASED TECHNIQUE FOR RENDERING COLORS ON AN OUTPUT DEVICE" describes techniques for characterizing output devices such as printers, so that a color specified in a device-independent representation (e.g., XYZ) can be faithfully rendered on the target printer. Included in the techniques described are the use of what are referred to as umbrella colors. The umbrella colors are disclosed as being preferably characterized by the highest luminance that the target printer is capable of rendering for a given chromaticity (hue and chroma). Where the target printer includes a set of primary colorants (e.g., CMY or CMYOG), the umbrella colors include a single primary colorant at values from 0 to 100% dot area or pairwise combinations of the primary colorants over that range. Such a set of color samples could be used in connection with the present invention. Alternatively, an industry-standard color chart, such as a 56-color chart available from GretagMacBeth (located in New Windsor, N.Y.) could be used.

A chart with a possible set of umbrella colors for a CMY printer is shown associated with step 100. The color samples are laid out in a hexagonal pattern, with the center sample devoid of colorant. A set of spokes is shown overlaid, and the samples at the outer ends of the spokes are maximum dot coverage of a single primary colorant (yellow, magenta, cyan) or of maximum dot coverage of a pair of adjacent primary colorants (red=yellow-magenta overprint, blue=magenta-cyan overprint, green=cyan-yellow overprint. Each of the 120° sectors of the chart is equivalent to one of the three square charts shown in U.S. Pat. No. 5,650,942. The charts in U.S. Pat. No. 5,650,942 are each 11×11, which is suitable, although the chart shown in FIG. 2 herein would also work well. Acceptable results could be obtained using only 7 samples, namely the samples at the center and the six corners of the hexagon.

In a step 102, each sample is measured with scanner 43 to obtain a set of scanner tristimulus (in particular, RGB) measurements of the six samples and the region of bare substrate. In other embodiments, scanner representations other than RGB representations may be produced by scanner 43. The measured device-dependent values from this step can be stored in table 65.

In a step 105, each sample is measured with spectrophotometer 45 to obtain a set of device-independent tristimulus (in particular, XYZ) measurements of the samples. In other embodiments, device-independent tristimulus color representations other than XYZ representations (such as the CIE-defined xyY, Lab, or Luv color spaces) may be produced by spectrophotometer 45. The measured device-independent values from this step can be stored in table 70.

In a step 107, a program executing on processor 12 uses the information in tables 65 and 70 to compute calibration information. The calibration information implements a function that maps scanner measurements of unknown arbitrary colors to device-independent values. In specific embodiments, the function is implemented as a table, indexed by uncorrected scanner chromaticity values. The table contains entries corresponding to device-independent tristimulus measurements and device-dependent lightness values.

3.2 Constructing the Calibration Table

Figure 3:
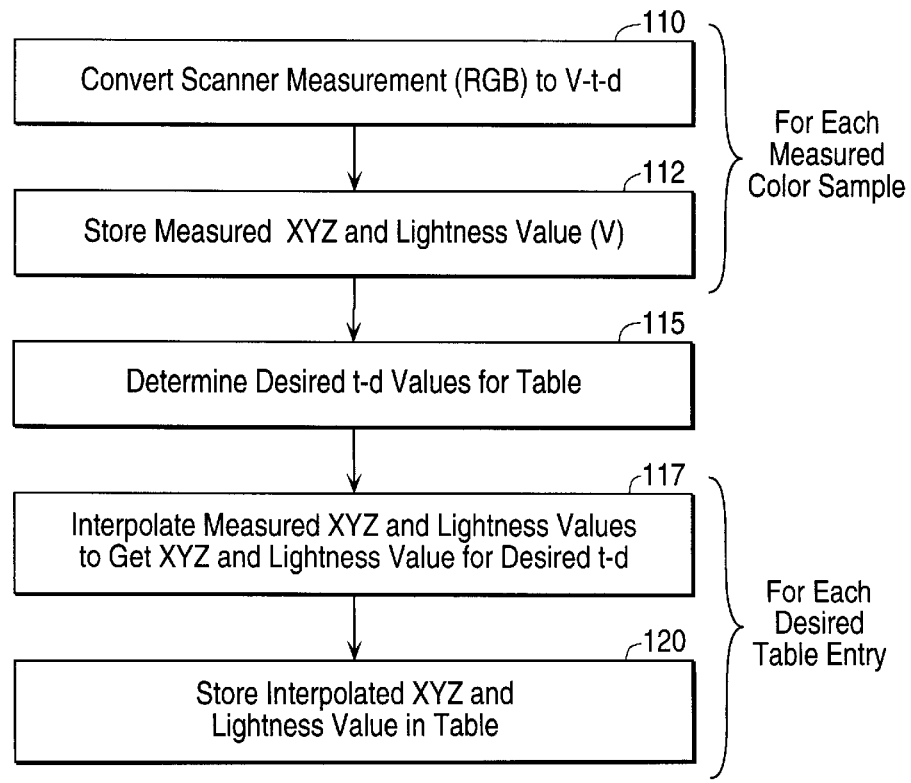
FIG. 3 is a flowchart showing a method of constructing a calibration table.

FIG. 3 is a flowchart showing additional details of step 107 (FIG. 2) of constructing calibration table 75 (FIG. 1). As described above, the color samples have been measured with the scanner and with a spectrophotometer, so as to generate RGB and XYZ values for each color sample. For each measured sample, the scanner values (RGB typically) are converted, at a step 110, to a chromaticity representation (V-t-d). This could equally well have been performed in connection with measurement step 102 in FIG. 1.

The measured XYZ values and the derived lightness value (V) are stored in association with the derived chromaticity values (t, d) at a step 112. Once all the samples are processed, what is stored represents a table of XYZ-V entries indexed by t and d, but the values of t and d arise from the particular colors of the measured samples, and are typically not suited to a rapid convenient look-up. Rather, what is desired is a table containing XYZ-V entries for equally spaced values of the chromaticity coordinates. Therefore, at a step 115, the desired values of t and d for the calibration table are determined. If the table is to be indexed by equal increments of t and d, this determination is a somewhat degenerate step, although it could be possible for the system to allow the user to specify the increments of t and d.

However, in a preferred implementation, the look-up table is indexed by r and θ, which represent chroma and hue angle and are derived from t and d. Accordingly, the desired t-d pairs are determined as those values that correspond to uniformly spaced r and θ values. Thus, the desired r-θ pairs are determined (essentially trivially), and those values are converted to t and d values using the inverse of the equations above. The inverse conversion equations are:

ti $t = r * \cos\theta$; and $$d = r * \sin\theta.$$

In a specific embodiment, r is an 8-bit quantity and θ is a 9-bit quantity.

Once the desired t-d pairs are determined, XYZ values and lightness values corresponding to each desired t-d pair are determined, at a step 117, from the measured XYZ values and derived lightness values that were stored at step 112. This is accomplished by two-dimensional interpolation in the t-d space. The interpolation can be based on the nearest three points or the nearest four points in the t-d space. Currently interpolating based on the nearest four points is preferred.

Finally, at a step 120, each of the interpolated XYZ-V entries is stored in the calibration table. In a specific embodiment, the table includes 256×512 entries, namely an entry for each possible 8-bit value of r and each possible 9-bit value of θ. The choice of 8 bits (possible values of 0–255) and 9 bits (possible values of 0–511) for r and θ provides sufficient precision that two colors whose r and θ values, at this precision, differed by 1 would not generally be perceived as different colors by a human viewer. Higher levels of precision are, of course, possible should special applications require them. Further, it might be desirable to compute r and θ to more bits of precision if the scanner inputs had a greater bit depth.

Figure 4:
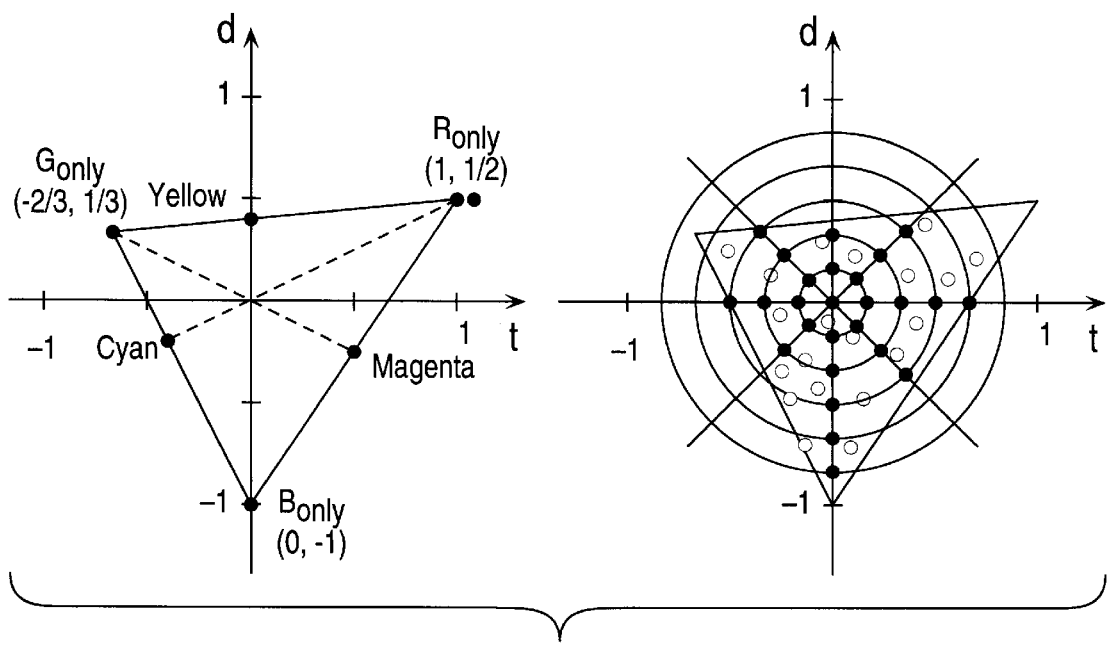
FIG. 4 (left-hand portion) schematically shows possible values in a particular chromaticity plane. The (right-hand portion) schematically shows a number of measured points (hollow circles) populating the chromaticity plane.

FIG. 4 (left-hand portion) shows schematically the possible values in the t-d plane. If a color has only an R component, t=1 and d=½. Similarly, if a color has only a G component, t=−⅔ and d=⅓, while if a color has only a B component, t=0 and d=−1. A triangle joining these points encloses all the possible t-d pairs that could arise in connection with a scanner measurement. Intermediate points on the sides of the triangle opposite the R, G, and B vertices correspond to cyan, magenta, and yellow.

FIG. 4 (right-hand portion) shows a number of measured points (hollow circles) populating the t-d space within the triangle. Superimposed on the triangle are a number of equally spaced concentric circles, each denoting a locus of a fixed value of r (chroma). Also superimposed on the triangle are a number of radial lines spaced at equal angles, each denoting a locus of a fixed value of θ (hue angle). The concentric circles and the radial lines represent a grid in r-θ space, and their intersections represent r-θ pairs suitable for indexing the calibration table.

Since the color samples were chosen to provide sufficient colors to populate the scanner's color space, there was generally no effort (and generally no way) to locate them such that their chromaticity values would fall on the intersections of the circles and radial lines. However, those of the intersections that fall within the triangle (solid black circles) are candidates for points in the calibration table. Note that not all hue angles and chroma values are possible, and so those intersection points (not drawn with solid black circles) that don't correspond to suitable entries have zeros stored for their entries.

3.3 Linearizing and Balancing the Scanner

It is generally preferred that each raw scanner measurement is converted into a linearized and balanced scanner measurement before any further use is made of it. This includes measuring the calibration color samples, as described above, and measuring arbitrary colors, as described below. This is a well-known correction and will only be described briefly below.

In one embodiment, linearizing and balancing a scanner producing RGB measurements involves the following steps:

1) Assembling a set of calibration patches $N_0, N_1, \ldots N_n$ that are chromatically neutral and are evenly spaced in reflectance. $N_0$ represents absolute darkness as closely as possible and $N_n$ represents the brightest possible white paper (or bare substrate).

2) Devising a mapping LS from raw scanner RGB values to linearized and balanced scanner RGB values. LS must cause each of the raw scanner RGB values for the calibration patches to have equal linearized and balanced scanner R, G, and B values. Let $K_i$ be that value for $N_i$, i=1, ..., n. That is, the linearized and balanced scanner RGB values for $N_i$ are $(K_i, K_i, K_i)$, i=1, ..., n. $K_0$=0. $K_n$=the maximum RGB coordinate value. $K_0, K_1, \ldots K_n$ are evenly spaced in the range of RGB coordinate values.

In one embodiment linearized and balanced scanner values lie in the interval [0,255]. The function LS is implemented as a set of three look-up tables, one each for the R, G, and B coordinates. Each table is indexed by raw scanner values and contains linearized and balanced scanner values.

4. Transforming Arbitrary Colors

Figure 5:
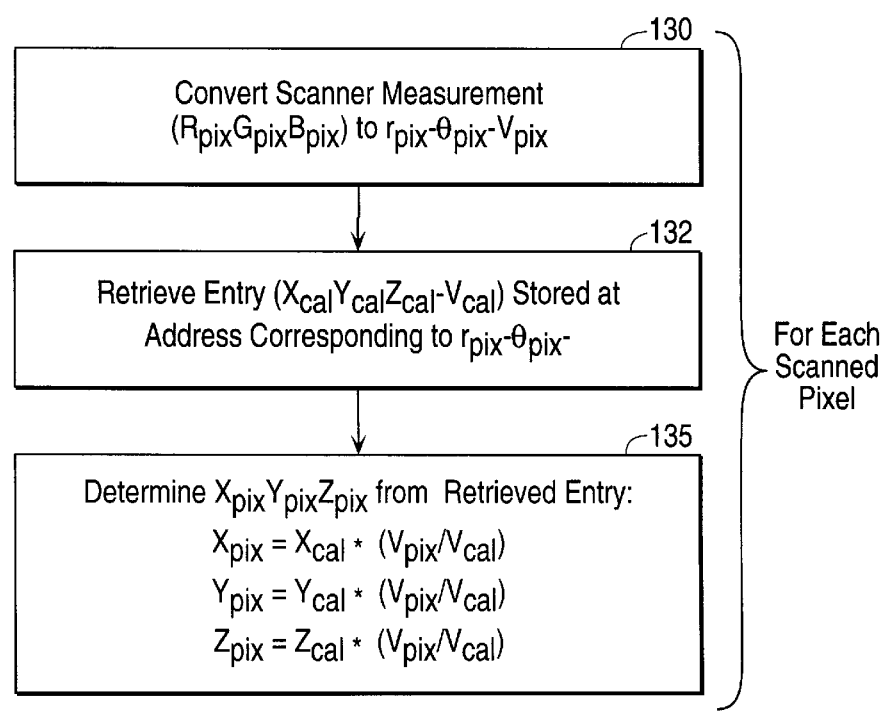
FIG. 5 is a flowchart showing a method of transforming an RGB measurement of an arbitrary color into a corresponding XYZ measurement.

FIG. 5 is a flowchart showing a method of transforming an RGB measurement of an arbitrary color (having values denoted by $R_{pix}$, $G_{pix}$, and $B_{pix}$) into a corresponding XYZ measurement (having values denoted by $X_{pix}$, $Y_{pix}$, and $Z_{pix}$) At a step 130, a program running on processor 12 converts the $R_{pix}$, $G_{pix}$, and $B_{pix}$ values to the r-θ-V representation (having values $r_{pix}$, $G_{pix}$, and $V_{pix}$). At a step 132, the values of $r_{pix}$ and $θ_{pix}$ are used to index into the calibration table and retrieve an XYZ-V entry (having XYZ values designated $X_{cal}$, $Y_{cal}$, and $Z_{cal}$, and a lightness value designated $V_{cal}$). At a step 135, the corrected device-independent values, designated $X_{pix}$, $Y_{pix}$, and $Z_{pix}$, for the pixel are computed using the following equations:

$$X_{pix}=X_{cal} * (V_{pix}/V_{cal});$$

$$Y_{pix}=Y_{cal} * (V_{pix}/V_{cal}); \text{ and}$$

$$Z_{pix}=Z_{cal} * (V_{pix}/V_{cal}).$$

5. Adaptation to Accommodate Limited Gamut of Output Devices

In some instances, where it is known that the scanned input is destined for an output device (e.g., printer or monitor) whose output gamut is less than that of the input colors, it can be desirable to adapt the XYZ values that are converted to output commands. For example, the above-mentioned U.S. Pat. No. 5,650,942 describes techniques for making output destined for a high-end printer look good when printed on a low-end proofing printer or displayed on a monitor of lesser gamut. In those cases, the range of commanded (desired) chroma values was smoothly mapped (compressed) to a lesser range (see, e.g., FIG. 20 in the patent). This approach can be used in connection with XYZ values produced by the present invention. A straightforward way would be to take the XYZ values from the calibration table, convert them to r-θ-V values using the meta RGB equations shown in column 7 of the patent, and then reduce the r value at the upper end of the chroma range for adaptation. The mapping of r could be implemented with a two-dimensional lookup table, indexed by r and θ, to provide the reduced value of r. The adaptation function is generally different for the different hue angles, since the output device will typically require different amounts of compression.

A different way would be to implement the adaptation at the stage of accessing the XYZ-V calibration table. After converting the scanner RGB values to r-θ-V values at step 130, as described above, the system could reduce the r value in accordance with the desired adaptation before accessing the table at step 132, and use the XYZ-V entry stored at the address defined by the lower r value.

Another approach, normally preferred, is to build the adaptation into the XYZ-V calibration table, it being recognized that the table would then provide values that are customized for a particular output device. This can be accomplished as follows. As mentioned above in connection with FIG. 2, step 115 determines the desired t-d values for the calibration table. If no adaptation is desired, the above description of step 115 applies. If adaptation is desired, the set of t-d values needed for the interpolation in step 117 would be determined on the basis of the compressed range of r (amount of compression typically being different for different values of θ), but the entries would then be stored for the full range of r. In this way, the table, when accessed by values of r that would be outside the gamut of the output device, would output entries generated with data characterized by lesser values of r (in accordance with the adaptation function).

6. References

The following publications provide additional background and are incorporated by reference in their entirety for all purposes:

E. M. Granger, "Is CIE L*a*b Good Enough for Desktop Publishing?", Device-Independent Color Imaging, SPIE, Vol. 2170, pp. 144–148 (7–8 February 1994, San Jose, Calif.);

E. M. Granger, "ATD, Appearance Equivalence, and Desktop Publishing," Device-Independent Color Imaging, SPIE, Vol. 2170, pp. 163–168 (7–8 February 1994, San Jose, Calif.); and E. M. Granger, "Gamut Mapping for Hard Copy Using the ATD Color Space," Device-Independent Color Imaging II, SPIE, Vol. 2414, pp. 27–35 (7–8 February 1995, San Jose, Calif.).

Also incorporated by reference in their entirety for all purposes are:

U.S. Pat. No. 5,650,942, issued Jul. 22, 1997, to Edward M. Granger for "APPEARANCE-BASED TECHNIQUE FOR RENDERING COLORS ON AN OUTPUT DEVICE;" and U.S. application Ser. No. 08/709,774, filed Sep. 9, 1996, by Edward M. Granger for "SCANNER CALIBRATION TECHNIQUE."

7. Conclusion

In conclusion, it can be seen that the present invention provides extremely effective and efficient techniques for calibrating scanners and thereby allowing the conversion of a scanner measurement to a device-independent representation.

While the above is a complete description of specific embodiments of the invention, various modifications, alternative constructions, and equivalents may be used. Therefore, the above description should not be taken as limiting the scope of the invention as defined by the claims.

What is claimed is:

1. A computer-implemented method of calibrating a scanner, the method comprising the steps of:

providing a set of color samples having a plurality of hues;

measuring each sample with a device that provides a device-independent measurement to obtain a set device-independent measurements of the samples;

measuring each sample with the scanner to be calibrated to obtain a set of scanner measurements in a representation in a chromaticity space that is spanned by a lightness value that correlates with luminance and a pair of chromaticity values, referred to as a chromaticity pair, in a two-dimensional space that spans hue and chroma; and constructing a look-up table, the look-up table having respective entries for a plurality of chromaticity pairs, the entry for a given chromaticity pair including (a) a device-independent set of values corresponding to the given chromaticity pair, and (b) a device-dependent lightness value;

the look-up table entries being derived from the set of device-independent measurements and the set of scanner measurements by constructing a first table having a plurality of entries, each corresponding to a respective one of the set of samples, the entry for a given sample being labeled by the values of the device-dependent chromaticity coordinates for the given sample, the entry for the given sample including the device-independent measurement for the given sample, and the device-dependent lightness value for the given sample; and using the first table to construct a second table having a different plurality of entries, said entries being labeled by equally spaced values of the pair of chromaticity coordinates, and being derived by interpolating values of entries in the first table.

2. The method of claim 1 wherein the device-independent measurements are XYZ values.

3. The method of claim 1 wherein the samples are printed from individual ones and pairwise overprints of a set of primary colorants.

4. The method of claim 1 wherein at least one of the samples includes at least one primary colorant at maximum dot coverage.

5. The method of claim 1 wherein the look-up table incorporates an adaptation function that characterizes a target output device.

6. The method of claim 1 wherein:

the scanner provides RGB values;

the pair of chromaticity values, denoted r and g, are related to the RGB values according to the equations $r=R/(R+G+B)$ and $g=G/(R+G+B)$; and the lightness value, designated V', is given by the equation $V'=(R+G+B)$.

7. The method of claim 1 wherein:

the scanner provides RGB values; and the step of measuring each sample with the scanner includes converting the RGB values to the representation in the chromaticity space.

8. The method of claim 7, wherein the scanner measurements are linearized and balanced RGB values.

9. The method of claim 1 wherein:

the scanner provides RGB values;

the pair of chromaticity values, denoted t and d, are related to the RGB values according to the equations $t=2(R-G)/(2R+3G+2B)$ and $d=(R+G-2B)/(2R+3G+2B)$; and the lightness value, designated V, is given by the equation $V=(2R+3G+2B)/2$.

10. The method of claim 9 wherein:

the look-up table is labeled by a saturation value r and a hue angle θ where r and θ are related to t and d according to the equations $r=(t^2+V^2)^{1/2}$; and $\theta=\tan^{-1}(t/d)$.

11. A computer-implemented method of calibrating a scanner, the method comprising the steps of:

measuring each of a set of color samples with a device that provides a device-independent measurement to obtain a set of device-independent measurements of the samples;

measuring each sample with the scanner to be calibrated to obtain a set of scanner tristimulus measurements of the samples;

converting each scanner tristimulus measurement to a representation in a chromaticity space that is spanned by a lightness value that correlates with luminance and a pair of chromaticity values, referred to as a chromaticity pair, in a two-dimensional space that spans hue and chroma;

constructing a first table having a plurality of entries, each corresponding to a respective one of the set of samples, the entry for a given sample being labeled by the values of the device-dependent chromaticity coordinates for the given sample, the entry for the given sample including the device-independent measurement for the given sample, and the device-dependent lightness value for the given sample; and using the first table to construct a second table having a different plurality of entries, said entries being labeled by equally spaced values of the pair of chromaticity coordinates, and being derived by interpolating values of entries in the first table.

12. A computer-inplemented method of correcting a scanner measurement of an arbitrary color, the method comprising the steps of:

converting the scanner measurement to a representation in a chromaticity space that is spanned by a lightness value that correlates with luminance and a pair of chromaticity values in a two-dimensional space that spans hue and chroma, the scanner measurement thus providing a pair of uncorrected chromaticity values and an uncorrected lightness value;

determining, as a first function of the pair of uncorrected chromaticity values a set of device-independent tristimulus values and a lightness value; and generating, as a second function of the set of device-independent tristimulus values, the lightness value, and the uncorrected lightness value, corrected device-independent tristimulus values for the scanner.

13. The method of 12 a wherein the first function is implemented by providing a look-up table having respective entries for a plurality of chromaticity coordinate pairs, the entry for a given chromaticity pair including (a) a set of device-independent tristimulus values, and (b) a device-dependent lightness value;

the given entry's set of device-independent tristimulus values corresponding to a calibration measurement using the scanner that yielded (i) uncorrected chromaticity values corresponding to the given chromaticity pair and (ii) the entry's device-dependent lightness value.

14. The method of 12 wherein the second function is implemented by multiplying each of the set device-independent tristimulus values, by the ratio of the uncorrected lightness value to the lightness value.

15. The method of claim 12 wherein the first function incorporates an adaptation function that characterizes a target output device.

16. A computer program product for execution in a system including a processor and memory, the product comprising a computer storage medium comprising code that directs the processor to effect the method of claim 12.

17. A computer-implemented method of correcting a scanner measurement of an arbitrary color, the method comprising the steps of:

converting the scanner measurement to a representation in a chromaticity space that is spanned by a lightness value that correlates with luminance and a pair of chromaticity values in a two-dimensional space that spans hue and chroma, the scanner measurement thus providing a pair of uncorrected chromaticity values and an uncorrected lightness value;

providing a look-up table having respective entries for a plurality of chromaticity coordinate pairs, the entry for a given chromaticity pair including (a) a device-independent set of values, and (b) a device-dependent lightness value;

the given entry's device-independent set of values corresponding to a calibration measurement using the scanner that yielded (i) uncorrected chromaticity values corresponding to the given chromaticity pair and (ii) the entry's device-dependent lightness value;

retrieving from the table a device-independent set of values and a device-dependent lightness value corresponding to the pair of uncorrected chromaticity values; and generating corrected device-independent values for the scanner measurement by multiplying each of the retrieved device-independent values by the ratio of the scanner measurement's uncorrected lightness value to the retrieved lightness value.

18. The method of claim 17 wherein:

the table has entries corresponding to all possible chromaticity values derived from the scanner measurement; and said step of retrieving from the table includes directly retrieving an entry from the table.

19. The method of claim 17 wherein:

the table has a smaller number of entries than the number of possible chromaticity values derived from the scanner measurement; and said step of retrieving from the table includes retrieving a plurality of entries from the table, and interpolating values in the plurality of entries in order to obtain values for the device-independent set of values and a device-dependent lightness value corresponding to the pair of uncorrected chromaticity values.

20. The method of claim 17 wherein the scanner measurements are linearized and balanced RGB values.

21. A computer program product for execution in a system including a processor and memory, the product comprising a computer storage medium comprising code that directs the processor to effect the method of claim 17.

22. The method of claim 17 wherein:

the device-independent measurement of the arbitrary color is a set of XYZ values; and the scanner measurement of the arbitrary color is a set of RGB values;

the scanner provides RGB values;

the pair of chromaticity values, denoted t and d, are related to the RGB values according to the equations $t=2(R-G)/(2R+3G+2B)$ and $d=(R+G-2B)/(2R+3G+2B)$; and the lightness value, designated V, is given by the equation $V=(2R+3G+2B)/2.$ 23. The method of claim 22 wherein the table is labeled by a hue angle, θ, and a chroma value r, which are determined from t and d by the equations $r=(t^2+v^2)^{1/2}$; and $\theta=\tan^{-1}(t/d).$ 24. A memory for storing data for access by an application program being executed on a data processing system, the program operating to correct a scanner measurement of an arbitrary color, the scanner measurement being expressed in a representation in a chromaticity space that is spanned by a lightness value that correlates with luminance and a pair of chromaticity values, referred to as a chromaticity pair, in a two-dimensional space that spans hue and chroma, the memory comprising:

a look-up table having respective entries for a plurality of chromaticity pairs, the entry for a given chromaticity pair including
(a) a device-independent set of values corresponding to the given chromaticity pair, and
(b) a device-dependent lightness value;

wherein the look-up table is constructed by
constructing a first table having a plurality of entries, each corresponding to a respective one of the set of samples measured during a calibration procedure that generates device-independent measurements and device-dependent measurements, the entry for a given sample being labeled by the values of the device-dependent chromaticity coordinates for the given sample, the entry for the given sample including the device-independent measurement for the given sample, and the device-dependent lightness value for the given sample, and using the first table to construct a second table having a different plurality of entries, said entries being labeled by equally spaced values of the pair of chromaticity coordinates, and being derived by interpolating values of entries in the first table.

25. A computer-implemented method of calibrating a scanner, the method comprising the steps of:

measuring each of a set of color samples with a device that provides a device-independent measurement to obtain a set of device independent measurements of the samples;

measuring each sample with the scanner to be calibrated to obtain a set of scanner measurements in a representation in a chromaticity space that is spanned by a lightness value that correlates with luminance and a pair of chromaticity values in a two-dimensional space that spans hue and chroma;

constructing a first table having a plurality of entries, each corresponding to a respective one of the set of samples, the entry for a given sample being labeled by the values of the device-dependent chromaticity coordinates for the given sample, the entry for the given sample including the device-independent measurement for the given sample, and the device dependent lightness value for the given sample; and using the first table to construct a second table having a different plurality of entries, said entries being labeled by equally spaced values of the pair of chromaticity coordinates, and being derived by interpolating values of entries in the first table.

26. A computer-implemented method of correcting a scanner measurement of an arbitrary color, the scanner measurement being in a representation in a chromaticity space that is spanned by a lightness value that correlates with luminance and a pair of chromaticity values in a two-dimensional space that spans hue and chroma, the scanner measurement thus providing a pair of uncorrected chromaticity values and an uncorrected lightness value, the method comprising the steps of:

determining, as a first function of the pair of uncorrected chromaticity values, a set of device-independent tristimulus values and a lightness value; and generating, as a second function of the set of device-independent tristimulus values, the lightness value, and the uncorrected lightness value, corrected device-independent tristimulus values for the scanner.

27. The method of 26 a wherein the first function is implemented by providing a look-up table having respective entries for a plurality of chromaticity coordinate pairs, the entry for a given chromaticity coordinate pair including (a) a set of device-independent tristimulus values, and
(b) a device-dependent lightness value;

the given entry's set of device-independent tristimulus values corresponding to a calibration measurement using the scanner that yielded (i) uncorrected chromaticity values corresponding to the given chromaticity coordinate pair and (ii) the entry's device-dependent lightness value.

28. The method of 26 wherein the second function is implemented by multiplying each of the set device-independent tristimulus values, by the ratio of the uncorrected lightness value to the lightness value.

29. The method of claim 26 wherein the first function incorporates an adaptation function that characterizes a target output device.

30. A computer program product for execution in a system including a processor and memory, the product comprising a computer storage medium comprising code that directs the processor to effect the method of claim 26.

31. A computer-implemented method of correcting a scanner measurement of an arbitrary color, the scanner measurement being in a representation in a chromaticity space that is spanned by a lightness value that correlates with luminance and a pair of chromaticity values in a two-dimensional space that spans hue and chroma, the scanner measurement thus providing a pair of uncorrected chromaticity values and an uncorrected lightness value, the method comprising the steps of:

providing a look-up table having respective entries for a plurality of chromaticity coordinate pairs, the entry for a given chromaticity coordinate pair including
(a) a device-independent set of values, and
(b) a device-dependent lightness value;

the given entry's device-independent set of values corresponding to a calibration measurement using the scanner that yielded (i) uncorrected chromaticity values corresponding to the given chromaticity coordinate pair and (ii) the entry's device-dependent lightness value;

retrieving from the table a device-independent set of values and a device-dependent lightness value corresponding to the pair of uncorrected chromaticity values; and generating corrected device-independent values for the scanner measurement by multiplying each of the retrieved device-independent values by the ratio of the scanner measurement's uncorrected lightness value to the retrieved lightness value.

32. The method of claim 31 wherein:

the table has entries corresponding to all possible chromaticity values derived from the scanner measurement; and said step of retrieving from the table includes directly retrieving an entry from the table.

33. The method of claim 31 wherein:

the table has a smaller number of entries than the number of possible chromaticity values derived from the scanner measurement; and said step of retrieving from the table includes retrieving a plurality of entries from the table, and interpolating values in the plurality of entries in order to obtain values for the device-independent set of values and a device dependent lightness value corresponding to the pair of uncorrected chromaticity values.

34. The method of claim 31 wherein the device-independent measurement of the arbitrary color is a set of XYZ values.

35. The method of claim 31 wherein the scanner measurements are linearized and balanced RGB values.

36. A computer program product for execution in a system including a processor and memory, the product comprising a computer storage medium comprising code that directs the processor to effect the method of claim 31.

37. The method of claim 31 wherein:

the scanner provides RGB values; and the scanner measurement of the arbitrary color is provided by converting the RGB values to a pair of chromaticity values, denoted t and d, and a lightness value denoted V, which are related to the RGB values according to the equations $$t=2(R-G)/(2R+3G+2B),$$

$$d=(R+G-2B)/(2R+3G+2B), \text{ and}$$

$$V=(2R+3G+2B)/2.$$

38. The method of claim 37 wherein the table is labeled by a hue angle θ and a chroma value r, which are determined from t and d by the equations $$r=(t^2+v^2)^{1/2}; \text{ and}$$

$$\theta=\tan^{-1}(t/d)$$

* * * * *